United States Patent
Nakamura et al.

(10) Patent No.: US 7,477,745 B2
(45) Date of Patent: Jan. 13, 2009

(54) LICENSE MANAGEMENT APPARATUS, LICENSE MANAGEMENT SYSTEM AND LICENSE MANAGEMENT METHOD

(75) Inventors: Mie Nakamura, Toyokawa (JP); Kazumi Sawayanagi, Itami (JP); Satoshi Ozeki, Nagoya (JP); Masahito Takano, Toyokawa (JP); Kana Yamauchi, Toyohashi (JP); Yoshihiko Yoshizaki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 537 days.

(21) Appl. No.: 10/270,161

(22) Filed: Oct. 15, 2002

(65) Prior Publication Data
US 2003/0072448 A1    Apr. 17, 2003

(30) Foreign Application Priority Data
Oct. 15, 2001    (JP)    ............... 2001-316739

(51) Int. Cl.
*H04N 1/44* (2006.01)
*G06F 7/04* (2006.01)
*H04K 1/00* (2006.01)
*H04L 9/00* (2006.01)

(52) U.S. Cl. ........................... 380/243; 726/26
(58) Field of Classification Search .................. 726/32, 726/33, 31, 26; 380/243
See application file for complete search history.

(56) References Cited

U.S. PATENT DOCUMENTS

| | | | | |
|---|---|---|---|---|
| 4,924,378 A | * | 5/1990 | Hershey et al. | ............... 726/29 |
| 5,023,907 A | * | 6/1991 | Johnson et al. | ............. 710/200 |
| 5,204,897 A | * | 4/1993 | Wyman | ............. 710/200 |
| 5,260,999 A | * | 11/1993 | Wyman | ............. 705/59 |
| 5,390,297 A | * | 2/1995 | Barber et al. | ............. 726/29 |
| 5,473,692 A | * | 12/1995 | Davis | ............. 705/59 |
| 5,579,222 A | * | 11/1996 | Bains et al. | ............. 717/167 |
| 5,671,412 A | * | 9/1997 | Christiano | ............. 707/104.1 |
| 5,845,065 A | * | 12/1998 | Conte et al. | ............. 726/31 |
| 5,889,860 A | * | 3/1999 | Eller et al. | ............. 705/51 |
| 6,101,606 A | * | 8/2000 | Diersch et al. | ............. 726/27 |
| 6,363,486 B1 | * | 3/2002 | Knapton, III | ............. 726/7 |
| 6,574,612 B1 | * | 6/2003 | Baratti et al. | ............. 705/59 |

(Continued)

FOREIGN PATENT DOCUMENTS

JP        06-223040        8/1994

(Continued)

OTHER PUBLICATIONS

Japanese Notification of Reasons for Refusal mailed on Jan. 11, 2007.

(Continued)

*Primary Examiner*—Christopher J Brown
(74) *Attorney, Agent, or Firm*—Morrison & Foerster LLP

(57) ABSTRACT

A license management apparatus is taught which includes a storing portion to store licenses for each of a plurality of operation functions of one of a plurality of operating function executing units, a discriminator to discriminate whether the number of licenses currently permitted for the use of one of the operation functions has reached a predetermined number based on contents of the storing portion upon request for a use of one of the operation functions, and a determination unit to determine whether the request for the use of one of the operation functions is to be permitted based on a discrimination result of the discriminator.

9 Claims, 15 Drawing Sheets

U.S. PATENT DOCUMENTS

| | | | |
|---|---|---|---|
| 6,772,340 B1 * | 8/2004 | Peinado et al. | 713/168 |
| 6,810,389 B1 * | 10/2004 | Meyer | 705/59 |
| 6,842,896 B1 * | 1/2005 | Redding et al. | 717/172 |
| 6,959,291 B1 * | 10/2005 | Armstrong et al. | 705/59 |
| 2002/0013772 A1 * | 1/2002 | Peinado | 705/51 |
| 2002/0015180 A1 * | 2/2002 | Tominaga | 358/1.15 |
| 2002/0103761 A1 * | 8/2002 | Glassco et al. | 705/59 |
| 2002/0152395 A1 * | 10/2002 | Zhang et al. | 713/200 |
| 2002/0174356 A1 * | 11/2002 | Padole et al. | 713/200 |
| 2005/0231747 A1 * | 10/2005 | Bledsoe et al. | 358/1.13 |

FOREIGN PATENT DOCUMENTS

| | | |
|---|---|---|
| JP | 10-11043 | 1/1998 |
| JP | 10-224593 A | 8/1998 |
| JP | 10-232732 A | 9/1998 |
| JP | 11-24918 | 1/1999 |
| JP | 2000-194552 | 7/2000 |
| JP | 2000-330784 A | 11/2000 |
| JP | 2001-014159 A | 1/2001 |
| JP | 2001-100989 | 4/2001 |
| JP | 2001-103270 | 4/2001 |
| JP | 2001-249850 | 9/2001 |

OTHER PUBLICATIONS

Japanese Decision of Refusal dated May 15, 2007, directed to counterpart JP application No. 2001-316739, ABS only.

* cited by examiner

T1

LICENSE MANAGEMENT
TABLE

PRINTER · · · · 3
SCANNER · · · 1
COPY · · · · · · 3
FAX · · · · · · · · 1

LICENSE MANAGEMENT
TABLE

PRINTER · · · · 3
SCANNER · · · 0
COPY · · · · · · 3
FAX · · · · · · · · 1

```
LICENSE MANAGEMENT
       TABLE

FUNCTION 79  · · · · 3

FUNCTION 80  · · · · 1

FUNCTION 81  · · · · 3

FUNCTION 82  · · · · 1

FUNCTION 83  · · · · 1
```

LICENSE MANAGEMENT
TABLE

FUNCTION 79 ···· 2
FUNCTION 80 ···· 1
FUNCTION 81 ···· 3
FUNCTION 82 ···· 1
FUNCTION 83 ···· 1

LICENSE MANAGEMENT
TABLE

FUNCTION 79 ···· 2
FUNCTION 80 ···· 0
FUNCTION 81 ···· 3
FUNCTION 82 ···· 1
FUNCTION 83 ···· 1

```
LICENSE MANAGEMENT
      TABLE

FUNCTION 79 ···· 1
FUNCTION 80 ···· 0
FUNCTION 81 ···· 3
FUNCTION 82 ···· 1
FUNCTION 83 ···· 1
```

```
LICENSE MANAGEMENT
      TABLE

FUNCTION 79 ···· 1
FUNCTION 80 ···· 1
FUNCTION 81 ···· 3
FUNCTION 82 ···· 1
FUNCTION 83 ···· 1
```

FIG.15

LICENSE MANAGEMENT APPARATUS, LICENSE MANAGEMENT SYSTEM AND LICENSE MANAGEMENT METHOD

This application claims priority to Japanese Patent Application No. 2001-316739, filed on Oct. 15, 2001, the disclosure of which is incorporated by reference in its entirety.

BACKGROUND OF THE INVENTION

1. Field of the Invention

The present invention relates to a license management apparatus, a license management system and a license management method for managing licenses for the use of plural operation execution units such as multifunction printing apparatuses.

2. Description of Related Art

Conventionally, a system in which plural operation function executing units such as multifunction type printing apparatuses, which can be used as, for example, a facsimile and a copying machine, and user's terminals are connected via a network, is known. In this system, it is also known that the control of the printing apparatuses by software can be performed from the user's terminals by supplying licenses thereto.

For example, Japanese Unexamined Laid-open Patent Publication H11-24918 discloses techniques for integrally controlling the number of software licenses for user's terminals so that a server checks the number of software licenses when the user activates the software from his/her terminal and determines whether the software is to be activated.

Furthermore, Japanese Unexamined Laid-open Patent Publication H10-11043 discloses techniques in which a server checks the number of licenses currently available when a personal computer requests a license for downloading fonts, and allows downloading of the fonts to the user's terminal by transmitting a download permit signal to a download apparatus if available.

Now, in the aforementioned system in which plural multifunction type printing apparatuses or the like and user's terminals are connected via a network, one of the functions of the printing apparatuses, e.g., a printing function, may be used frequently by users, but another function, e.g., a facsimile function, may seldom be used.

According to the aforementioned conventional license supply techniques, since a package license is given to all of the controllable functions of the printing apparatuses including a facsimile function, a copying function and a printer function, license fee differentiation based on the frequency of use cannot be realized. Accordingly, there is a drawback that a user has to incur a wasteful financial burden for the license purchase.

Furthermore, in conventionally known techniques, software for controlling multifunction type printing apparatuses is managed with package licenses, and therefore the use of each function to be executed by the software cannot be restricted. Accordingly, for example, in image processing software, if both the "print" function and the "edit and print" function can be executed, the number of users corresponding to the number of licenses can use both the functions, i.e., the "print" function and the "edit and print" function.

Although a printout time will not be affected even if many users use the "print" function simultaneously, if many users perform the "edit and print" function simultaneously, since it takes a time to edit, these jobs will tend to accumulate in the printing apparatus. In this case, there is a drawback that jobs executed later tend to take more time to be printed.

SUMMARY OF THE INVENTION

It is an object of the present invention to provide a license management apparatus capable of giving a license for each function of at least one of a plurality of operation function executing units to enable a license agreement in accordance with a frequency of use or smooth operation of each function.

It is another object of the present invention to provide a license management system capable of giving a license for each function of at least one of the plurality of operation function executing units.

It is still another object of the present invention to provide a license management method capable of giving a license for each function of at least one of the plurality of operation function executing units.

According to the first aspect of the present invention, a license management apparatus comprises:

a storing portion which stores the number of licenses for a use of each of plural operation functions of one or plural operating function executing units;

a discriminator which discriminates whether the number of licenses currently permitted for a use of one of the operation functions has reached a predetermined number based on contents of the storing portion upon request for the use of one of the operation functions; and determination means which determines whether the request for the use of one of the operation functions is to be permitted based on a discrimination result of the discriminator.

With this license management apparatus, the number of licenses for each one of the operation functions of at least one of the plurality of multifunction operation executing units, e.g., multifunction-type printing apparatuses each having a print function, a copy function, a facsimile function, etc., is set for each of the operation functions, and the set number is stored in the storing portion. Upon a user's request for a use of a certain operation function, it is determined whether the number of licenses currently permitted for the use of the operation functions has reached the number of licenses initially set for the use of the operation functions, and then it is determined whether the user's request is to be permitted based on the determination result.

Accordingly, by purchasing the number of licenses corresponding to the operating frequency for respective operation functions at the time of the license agreement of the operation function executing units, it becomes possible to avoid paying too much money for less frequently used operation functions.

Furthermore, since the number of licenses for a certain function which requires a longer processing time can be restricted, the job processing at the time of using the function can be performed smoothly.

According to the second aspect of the present invention, a license management system which manages plural licenses for a plurality of operation function executing units connected to a network, comprises:

a storing portion which stores the number of licenses for use with each of a plurality of operation functions of one or more operating function executing units;

a discriminator which discriminates upon request for a use of one of the operation functions whether the number of licenses currently permitted for the use of one of the operation functions has reached a predetermined number based on contents of the storing portion; and a determinator which determines whether the request for the use of one of the operation functions is to be permitted based on a discrimination result of the discriminator.

In this license management system, the number of licenses for the use of one of the operation functions is set for respective operation functions of the operation function executing units, and this set number is stored in the storing portion. Upon a user's request for the use of a certain operation function, it is determined whether the number of licenses currently permitted for the use of the operation function has reached the set number. Then, based on the determination result, it is determined whether the request for the use of the operation function is to be permitted.

According to the third aspect of the present invention, a license management method, comprises:

storing the number of licenses for a use of each of plural operation functions of one or plural operating function executing units into a storing portion;

discriminating whether the number of licenses currently permitted for a use of one of the operation functions has reached a predetermined number based on contents of the storing portion upon request for the use of one of the operation functions; and determining whether the request for the use of one of the operation functions is to be permitted based on a discriminated result.

In this license management method, the number of licenses for the use of an operation function is set for each operation function of the operation function executing units, and this set number is stored in the storing portion. Upon a user's request for the use of a certain operation function, it is determined whether the number of licenses currently permitted for the use of the operation function has reached the set number. Then, based on the determination result, it is determined whether the request for the use of the operation function is to be permitted.

Other objects and features will be apparent from the following detailed description of the present invention with reference to the attached drawings.

BRIEF DESCRIPTION OF THE DRAWINGS

The present invention will be more fully described and better understood from the following description, taken with the appended drawings, in which:

FIG. 4 is an exemplary drawing showing the current status of a license management table stored in a server according to an embodiment of the invention;

FIG. 5 is an exemplary drawing showing the situation in which "1" is subtracted from the number of licenses for the scanner in a license management table according to an embodiment of the invention;

FIG. 11 is an exemplary drawing of the current status of the license management table stored in a server according to an embodiment of the invention;

FIG. 12 is an explanatory drawing of the status in which "1" is subtracted from the number of licenses for the basic functions in a license management table according to an embodiment of the invention;

FIG. 13 is an explanatory drawing of the status in which "1" is subtracted from the number of licenses for the application functions in a license management table according to an embodiment of the invention;

FIG. 14 is an explanatory drawing of the status in which "1" is subtracted from the number of licenses for the basic functions in the license management table shown in FIG. 13;

FIG. 15 is an explanatory drawing of the status in which "1" is added to the number of licenses for the application functions in the license management table shown in FIG. 14;

DETAILED DESCRIPTION OF THE PREFERRED EMBODIMENTS

Figure 1:
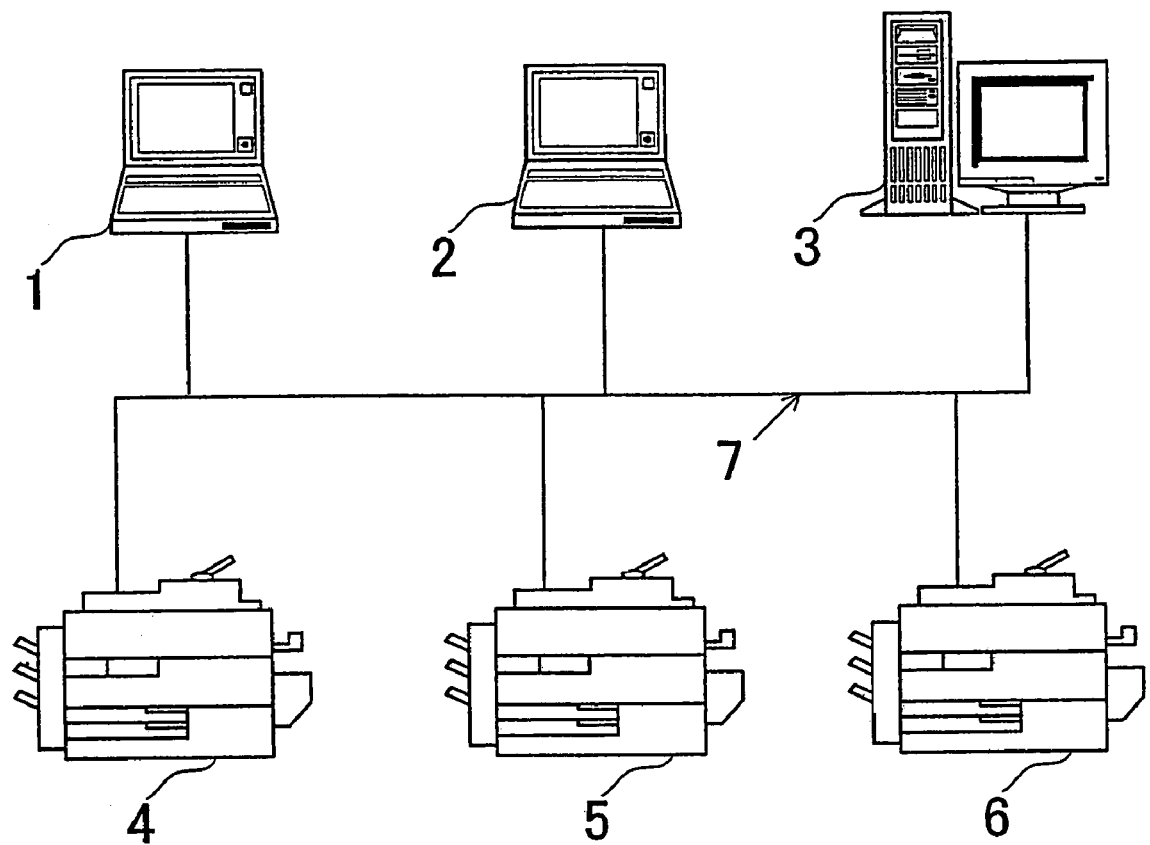
FIG. 1 is a structural view showing a system according to an embodiment of the present invention.

FIG. 1 is an exemplary structural view showing a license management system according to one embodiment of the present invention.

This license management system shown in FIG. 1 is provided with user terminal devices 1 and 2, a license management apparatus 3 (hereinafter referred to as "server"), plural multifunction-type printing apparatuses 4-6 as operation function executing units. These terminal devices 1 and 2, server 3 and printing apparatuses 4-6 are mutually connected through a network 7.

The printing apparatuses 4-6 are controlled by the terminal devices 1 and 2 through the server 3 and the network 7. The network 7 is composed of, for example, a LAN.

The terminal devices 1 and 2 are, for example, personal computers (hereinafter referred to as "PC"), and the server 3 is, for example, a workstation. In this embodiment, each of the printing apparatuses 4-6 is equipped with a printer function, a scanner function, a copy function and a facsimile (FAX) function.

Figure 2:
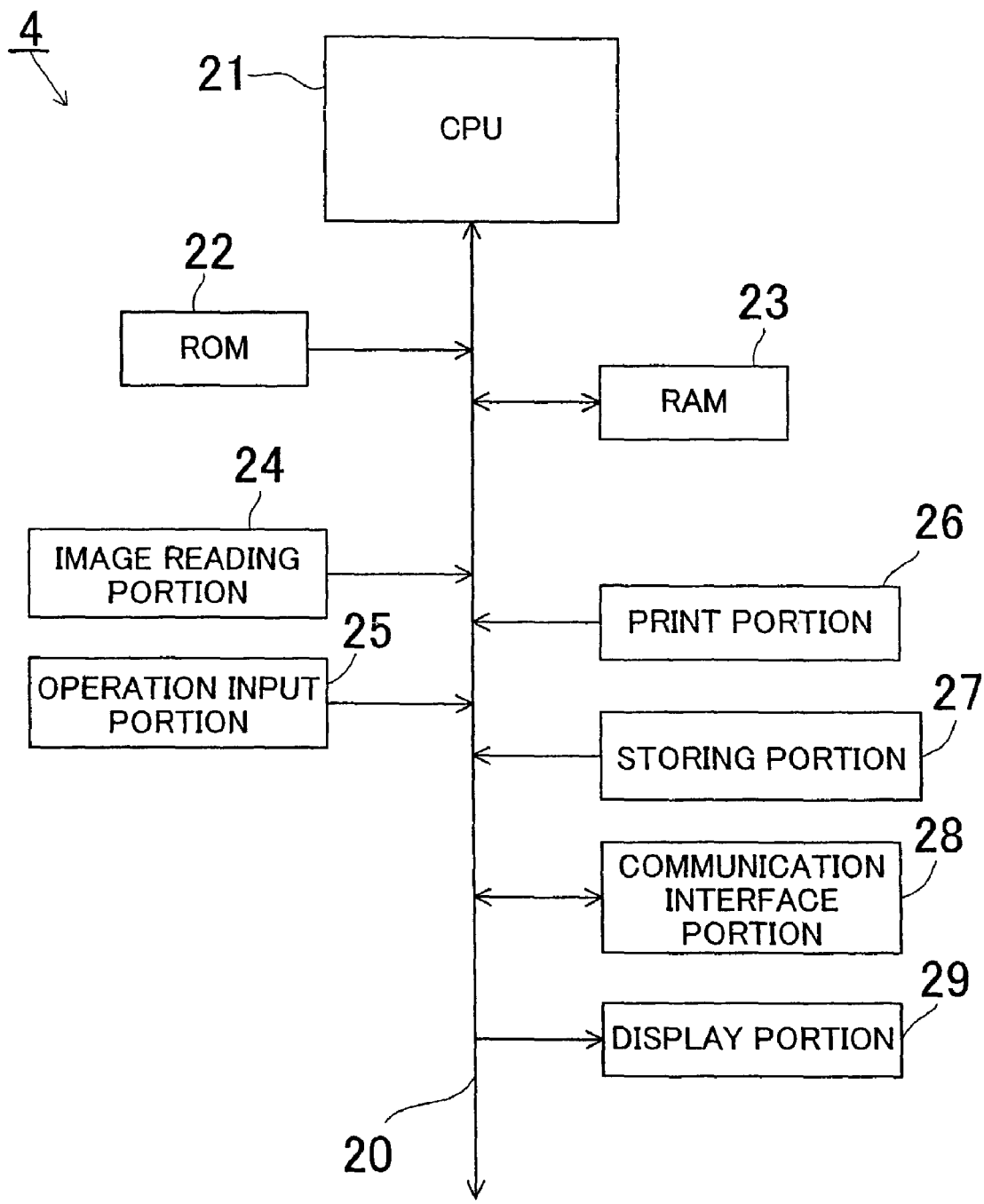
FIG. 2 is a block diagram showing an electric structure of a printing apparatus according to an embodiment of the system.

FIG. 2 is a block diagram showing an electric structure of the printing apparatus 4 representing the printing apparatus 4-6 according to an embodiment of the invention.

In FIG. 2, printing apparatus 4 is equipped with a CPU 21 which generally controls the entire apparatus, a ROM 22 which stores the program which the CPU 21 executes and a RAM 23 as a work area used as a data read/write area.

Connected to the CPU 21 are an image reading portion 24, an operation input portion 25, a print portion 26, a storing portion 27, a communication interface portion 28, a display portion 29 and so on.

The image reading portion 24 reads a draft image on a document base, an automatic document feeder (hereinafter referred to as "ADF") or the like.

The operation input portion 25 includes various operation keys on an operation panel (not shown).

The print portion 26 performs exposure processing, development processing, transfer processing, fixing processing, etc., and prints the image data read out with the image reading portion 24 or the image data inputted from the outside via the network in accordance with a designated job.

The storing portion 27 is composed of, for example, a hard disk drive unit for storing image data, designated print jobs and the like.

The communication interface portion 28 enables a signal/data communication among the terminal devices 1 and 2, the printing apparatuses 4-6 and the server 3.

The display portion 29 is provided on an operation panel to display an input operation status, etc., and composed of an LCD, an EL element, etc.

Figure 3:
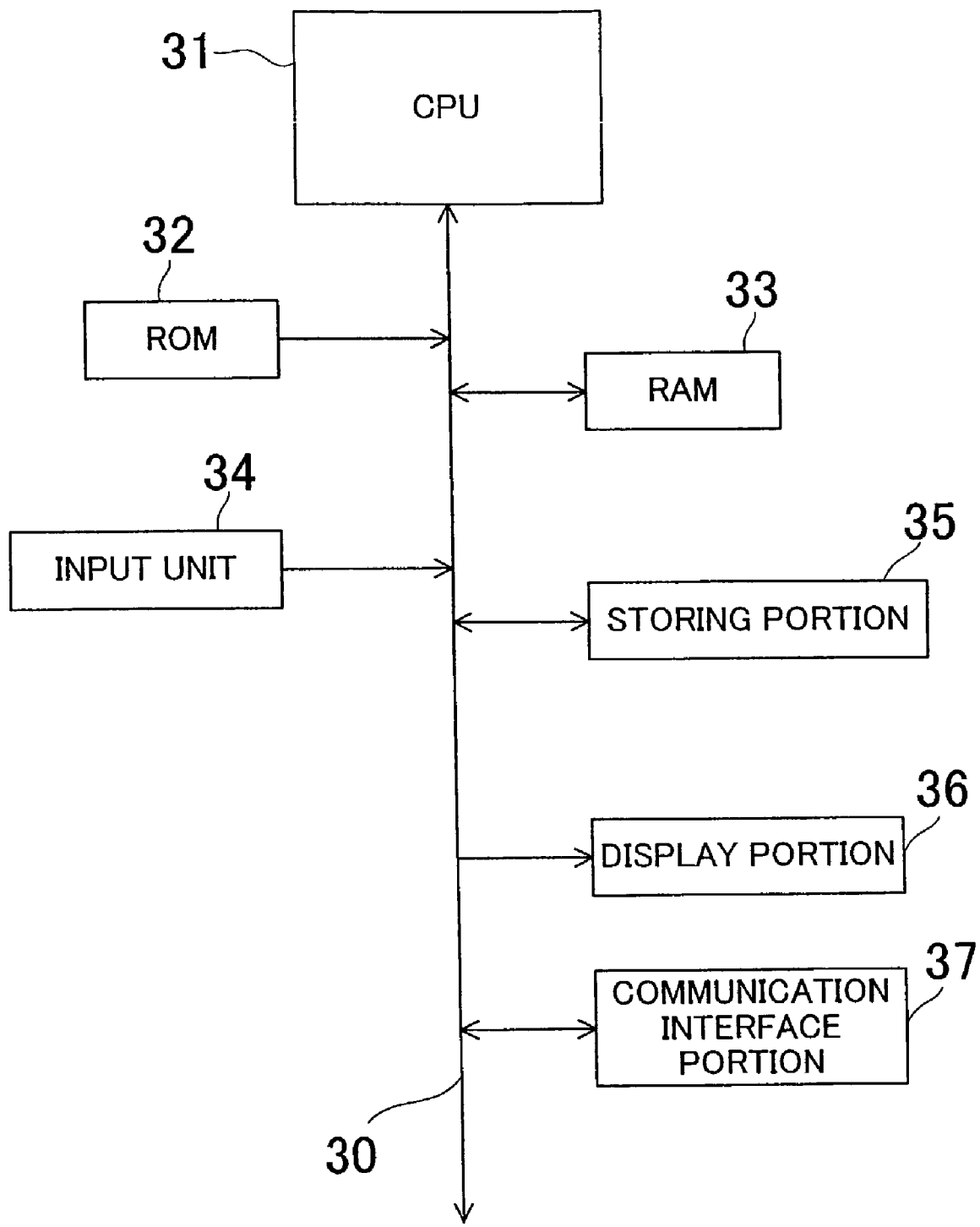
FIG. 3 is a block diagram showing an electric structure of a server according to an embodiment of the system.

FIG. 3 is a block diagram showing an electric structure of the server 3 according to an embodiment of the invention.

The server 3 is equipped with a CPU 31 which generally controls the entire server, a ROM 32 storing the program which the CPU 31 executes and a RAM 33 as a work area used as a data read/write area.

Connected to the CPU 31 via the bus 30 are an input unit 34 including a keyboard, a mouse, etc., a storing portion 35, a display portion 36, a communication interface portion 37, etc.

The storing portion 35 is composed of, for example, a hard disk drive unit, and stores the number of licenses set for each of the operation functions of the printing apparatus 4-6, i.e., the printer function, the scanner function, the copy function and the FAX function, as a license management table T1 as shown in FIG. 4.

The display portion 36 is a display such as a CRT or an LCD for showing the number of licenses, etc.

The communication interface portion 37 enables data/signal communication between the terminal devices 1 and 2 and among the printing apparatuses 4-6, and also transfers the determination result of the CPU 31 on whether a license is to be permitted to the terminal devices 1 and 2.

The CPU 31 may comprise a discriminator to discriminate whether the number of licenses currently permitted for a use of an operation function has reached the number of licenses stored in the storing portion upon request for a use of an operation function of the printing apparatuses 4-6 from the user's terminal devices 1 and 2, and may also comprise a determinator to determine whether the request for the use of the operation function is to be permitted based on the discrimination result.

Furthermore, the CPU 31 may also comprise a subtractor to subtract "1" from the number of licenses in the license management table T1 when the request for the use of the operation function is permitted and for adding "1" to the number of licenses in the license management table T1 when the currently executing operation function is terminated. As will be apparent from this embodiment, whether the number of licenses currently permitted for a use of an operation function has reached the number of licenses initially set for the use of the operation function is discriminated by judging whether the number of the available licenses becomes "0" when subtracting "1" from or adding "1" to the number of licenses currently permitted for the use of the operation function upon permission or termination of the use of the operation function.

In the aforementioned license management system, as the number of licenses for a use of each operation function in three printing apparatuses, as shown in the license management table T1 of FIG. 4, three licenses are initially set for the use of the printing function, one license is initially set for the use of the scanner function, three licenses are initially set for the use of the copy function and one license is initially set for the use of the FAX function.

Now, it is assumed that the scanner function, one of the operation functions of the printing apparatuses 4-6, is activated from the user terminal device 1 when each function is not in use. In this case, upon the request for the use of the scanner, the CPU 31 of the server 3 determines whether the number of licenses currently permitted for the use of the scanner function is equal to the number of licenses initially set for the use of the scanner function. For example, it is determined whether the number of licenses for the use of the scanner function in the license management table T1 of the storing portion 35 of the server 3 is "0." In the non-use state, since the number of the available licenses is not "0," but "1" as shown in FIG. 4, the CPU 31 permits the use of the scanner function. Then, the CPU 31 subtracts "1" from the number of licenses for the use of the scanner function in the license management table T1 to update the number of licenses currently available for the use of the scanner function as "0," as shown in FIG. 5. In this state, any one of scanner functions of the printing apparatuses 4-6 can be used from the terminal device 1.

It is further assumed that the terminal device 2 requests activation of one scanner function of any one of the printing apparatuses 4-6 when the scanner function of the printing apparatus 4 is being used from the terminal device 1. At this time, the number of licenses available for a use of a scanner function in the license management table is "0," which means that the number of licenses currently permitted for the use of the scanner function has reached the number of licenses initially set for the use of the scanner function. Therefore, the CPU 31 of the server 3 determines to refuse the request for the use of the scanner function. Then, the refusal is notified to the user's terminal device 2 through the communication interface portion 37 of the server 3.

Next, it is assumed that the use of the scanner function of the printing apparatus 4 from the user's terminal device 1 is terminated. At this time, since the number of licenses available for a scanner function in the license management table T1 is "0" as shown in FIG. 5, the CPU 31 of the server 3 adds "1" to the number of licenses for the use of the scanner function in the license management table T1 after the termination of the scanner function to update the number "1" as shown in FIG. 4. Thus, the scanner function becomes available by a new request.

Another license management for the use of the other operation functions may be performed by the same procedures as mentioned above.

As mentioned above, the number of licenses currently available is stored in the storing portion 35 for each function of the printing apparatuses 4-6, i.e., the print function, the scanner function, the copy function and the FAX function. Therefore, upon request for a use of a certain operation function by a user, it is determined whether the request for the use of the operation function is to be permitted depending on whether the number of licenses stored in the table is "0." Accordingly, if a user purchases the number of licenses corresponding to the frequency in use of each function of the printer, the scanner, the copy and the FAX at the time of the license agreement for the operation function executing units, it is possible to avoid excessive costs for an operation function with less operation frequency.

Furthermore, when the CPU 31 of the server 3 permits the use of the operation function, since the number of licenses in the license management table T1 of the storing portion 35 is subtracted by "1," the subtracted result is stored as the number of licenses currently available. When the currently executing operation function is terminated, since the number of licenses stored in the license management table T1 of the storing portion 35 is added by "1," the added result is stored as the number of currently available licenses therein. Accordingly, if the number of licenses currently available is not "0," permission can be given to the use of the function, enabling an easy license management for each operation function.

Furthermore, a user can request to use a desired operation function at any time through the terminal devices 1 and 2. If the request is rejected at the time of request for the use of the operation function because the number of available licenses is insufficient, the refusal is notified to the user's terminal device. Accordingly, the user can cope with the situation quickly.

Figure 6:
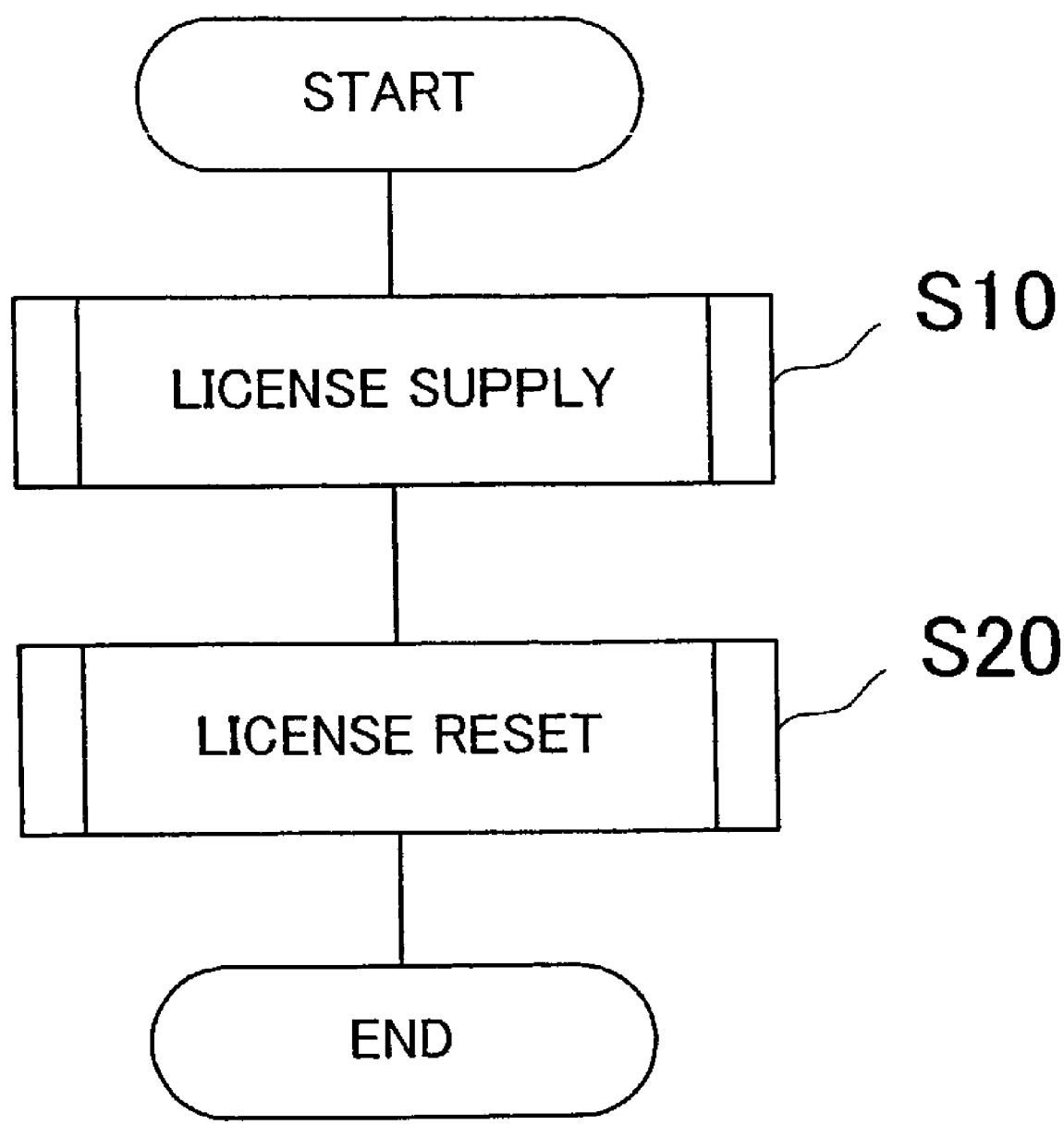
FIG. 6 is a flowchart showing a basic operation of the server in a system according to an embodiment of the invention.

Next, the main processing flow of the aforementioned server 3 according to an embodiment of the invention will be explained with reference to the flowchart shown in FIG. 6.

When a request for a use of an operation function from the user's terminal device 1 or 2 is received, a license is supplied to the terminal device 1 or 2 in S10. Then, in S20, a license reset is processed and the main process is terminated.

Figure 7:
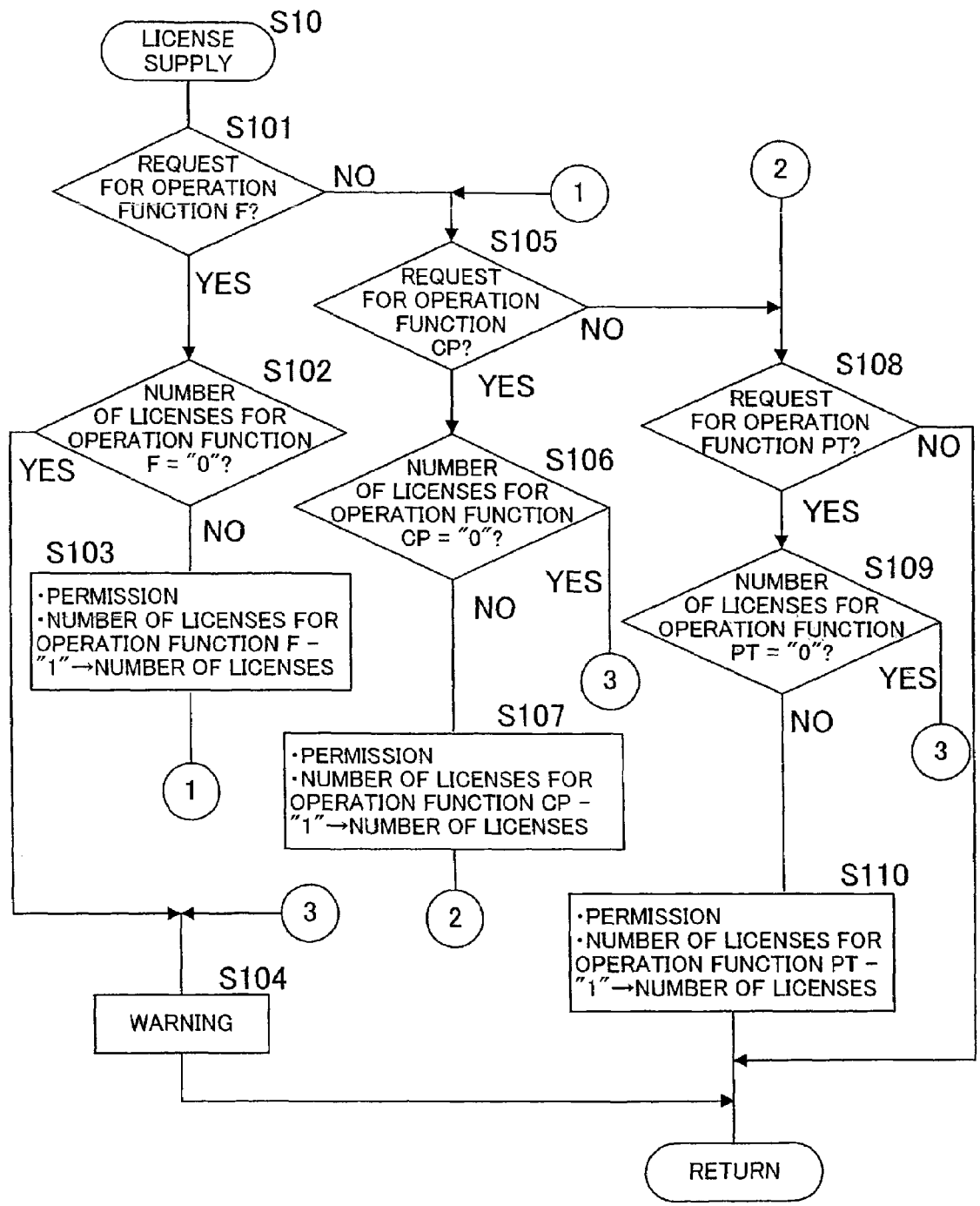
FIG. 7 is a flowchart showing the subroutine of the license supply processing according to an embodiment of the invention.

Next, the subroutine of the license supply processing (S10) will be explained with reference to the flowchart shown in FIG. 7. In this explanation, it is assumed that each of the printing apparatuses 4-6 has three functions, i.e., a FAX function, a copy function and a print function, and that the operation function F denotes a FAX function, the operation function CP denotes a copy function and the operation function PT denotes a print function.

In S101, it is determined whether the request from the terminal device is a request for the use of the operation function F. If it is the request for the use of the operation function F (YES in S101), the routine proceeds to S102. To the contrary, if it is not the request for the use of the operation function F (NO in S101), the routine proceeds to S105.

In S102, it is determined whether the number of licenses for the use of the operation function F stored in the storing portion 35 is "0." If it is not "0" (NO in S102), in S103, the use of the operation function F is permitted, and "1" is subtracted from the number of licenses available. Then, the routine proceeds to S105. In S102, if the number of licenses is "0," i.e., the number of licenses currently permitted have reached the number of licenses initially set (YES in S102), the number of licenses currently available is insufficient and the operation function F cannot be used. Therefore, the warning processing is performed in S104 and the routine returns. In this warning processing, the user's terminal device is notified that the use of the operation function F is not available.

In S105, it is determined whether the request is a request for a use of the operation function CP. If it is the request for the use of the operation function CP (YES in S105), the routine proceeds to S106. To the contrary, if it is not the request for the use of the operation function CP (NO in S105), the routine proceeds to S108.

In S106, it is determined whether the number of licenses currently available for the operation function CP stored in the storing portion 35 is "0." If it not "0" (NO in S106), in S107, the use of the operation function CP is permitted, and "1" is subtracted from the number of licenses currently available. Then, the routine proceeds to S108. In S106, if the number of licenses currently available is "0", i.e., the number of licenses currently permitted for the use of the operation functions CP is equal to the number of licenses initially set (YES in S106), the warning processing is performed in S104. Then, the routine returns.

In S108, it is determined whether the request is a request for the use of the operation function PT. If it is the request for the use of the operation function PT (YES in S108), the routine proceeds to S109. To the contrary, if it is not the request of the use of the operation function PT (NO in S108), the routine returns as it is.

In S109, it is determined whether the number of licenses currently available for the use of the operation function PT stored in the storing portion 35 is "0." If it is not "0" (NO in S109), the use of the operation function PT is permitted in S110, and "1" is subtracted from the number of licenses currently available. In S109, if the number of licenses currently available is "0," i.e., the number of licenses currently permitted for the use of the operation function PT is equal to the number of licenses initially set (YES in S109), the warning processing is performed in S104 and the routine returns.

Figure 8:
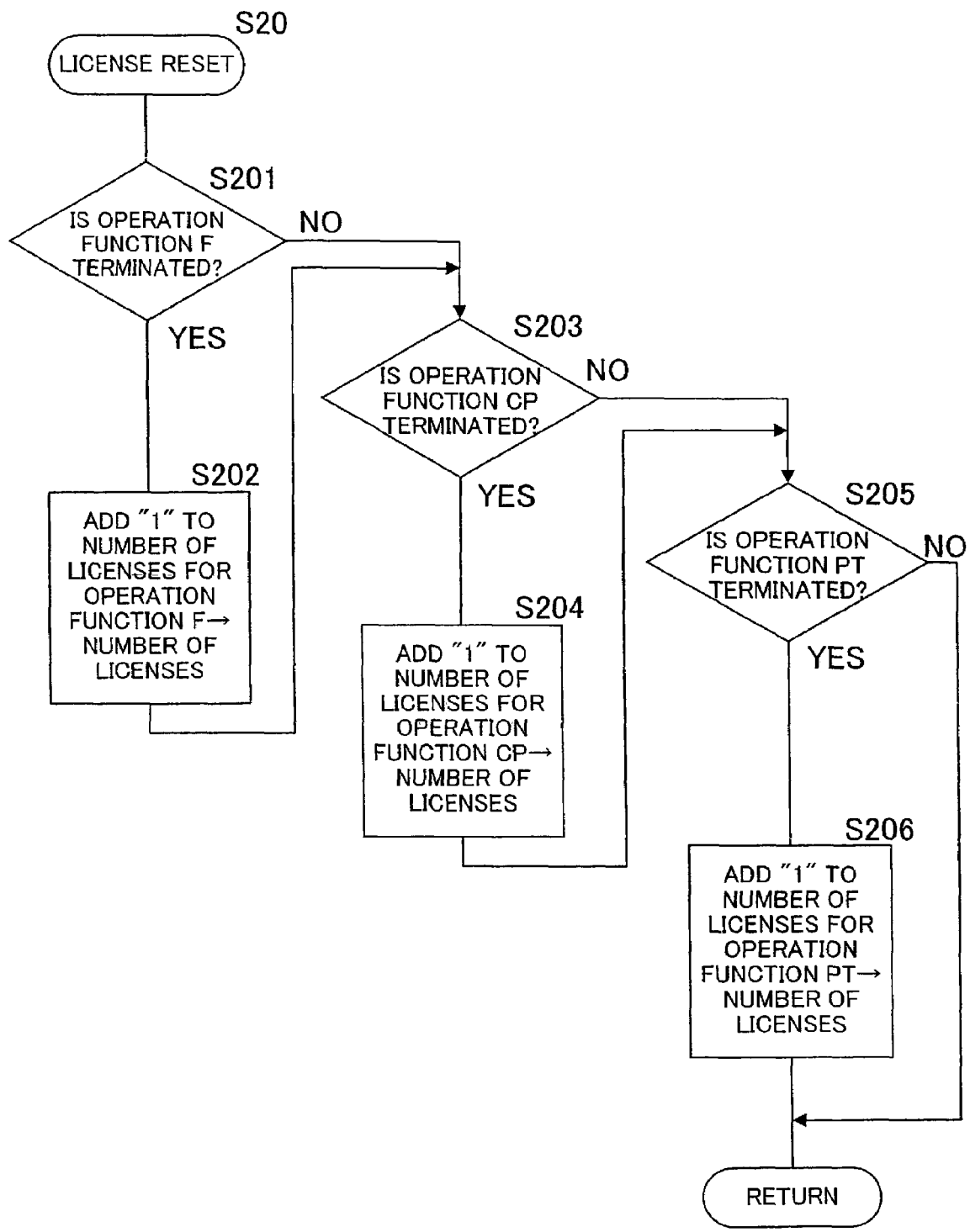
FIG. 8 is a flowchart showing the subroutine of the license reset processing according to an embodiment of the invention.

Next, the subroutine of the license reset processing S20 shown in FIG. 6 according to an embodiment of the invention will be explained with reference to the flowchart shown in FIG. 8.

In S201, it is determined whether the operation function F is terminated. If the operation function F is terminated (YES in S201), "1" is added to the number of licenses for the use of the operation function F in S202, and the routine proceeds to S203. If the operation function F is not terminated (NO in S201), the routine proceeds to S203 as it is.

In S203, it is determined whether the operation function CP is terminated. If the operation function CP is terminated (YES in S203), "1" is added to the number of licenses for the use of the operation function CP in S204, and the routine proceeds to S205. If the operation function CP is not terminated (NO in S203), the routine proceeds to S205 as it is.

In S205, it is determined whether the operation function PT is terminated. If the operation function PT is terminated (YES in S205), "1" is added to the number of licenses for the use of the operation function PT in S206, and the routine returns. If the operation function PT is not terminated (NO in S205), the routine returns as it is.

Next, another embodiment of the present invention will be explained with reference to the drawings.

Figure 9:
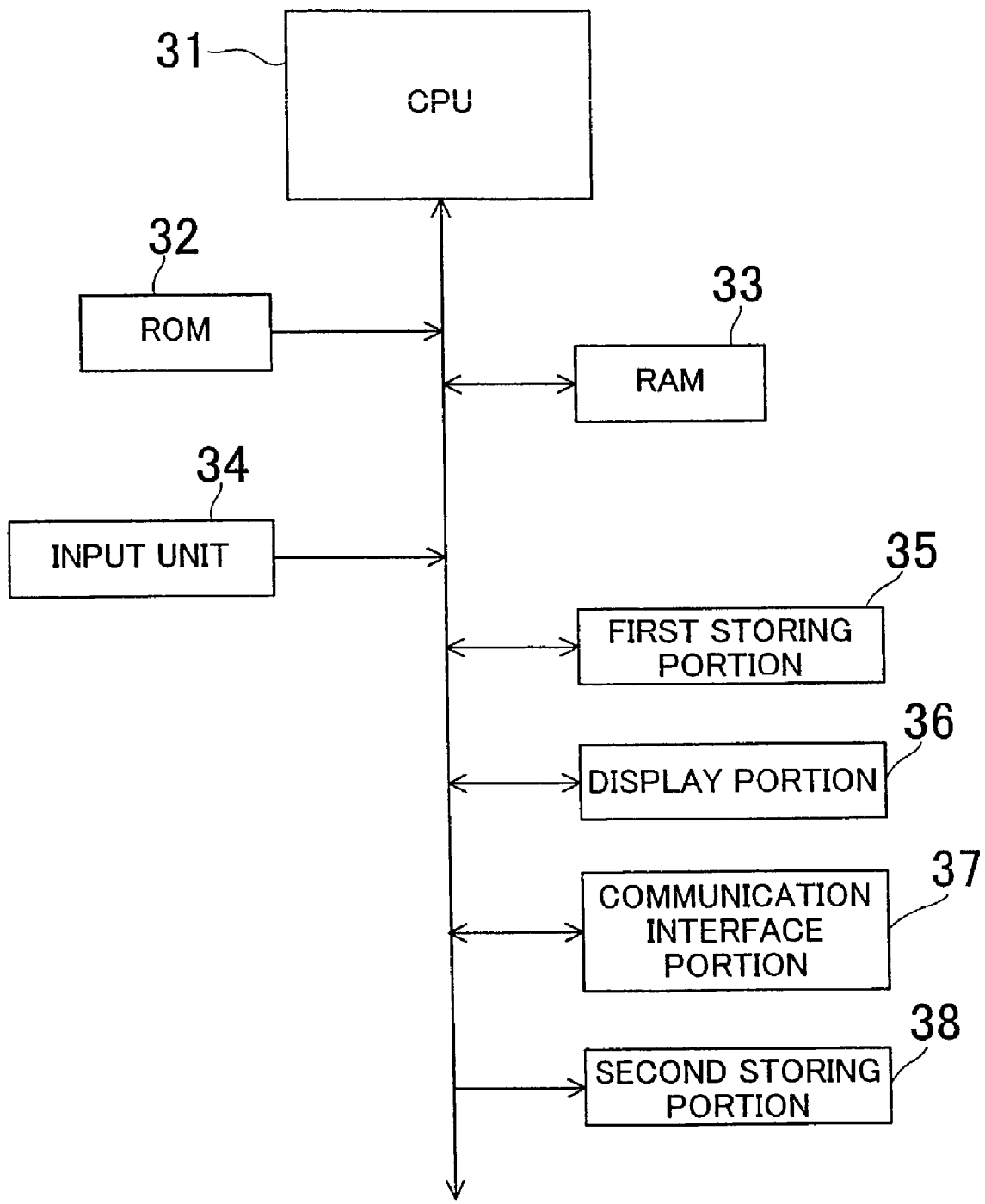
FIG. 9 is a block diagram showing an electric structure of a server of a system according to another embodiment of the present invention.
Figure 10:
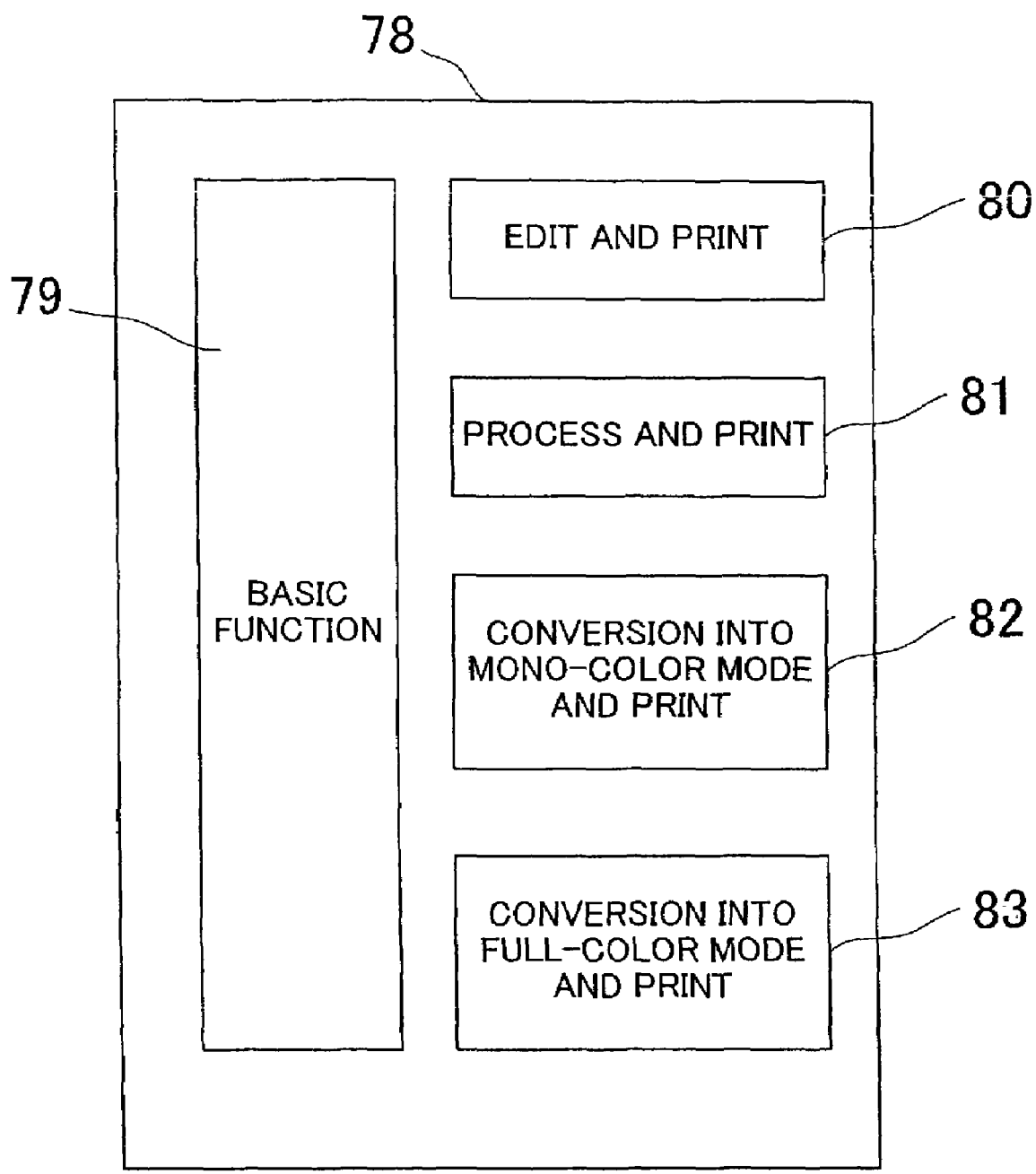
FIG. 10 is a structural view of the software stored in a server according to an embodiment of the invention.

FIG. 9 is a block diagram showing the electric structure of the server 3 according to another embodiment of the present invention. The same portion or corresponding portion in FIG. 3 will be allotted by the same reference numeral and the explanation will be omitted. The electric structure of the server 3 in this embodiment is substantially similar to that shown in FIG. 3 except that the second storing portion 38 is added. In this second storing portion 38, the software 78 shown in FIG. 10 is installed.

This software 78 is application software for image processing in connection with, for example, printing processing, and includes a basic function 79 and application functions 80-83.

The basic function 79 is, for example, a "print" function for printing. The application functions 80, 81, 82 and 83 are "edit and print" function, "process and print" function, "conversion into a monochrome color mode and print" function and "conversion into a full color mode and print" function, respectively. In accordance with each of these functions, the printing apparatuses 4-6 execute corresponding function. Regarding each of these functions, the number of licenses initially permitted is set, and the set number is stored in the license management table T2 of the storing portion 35 shown in FIG. 11. In this embodiment, as shown in FIG. 11, three licenses are given to the basic function 79, one license is given to the "edit and print" function 80, three licenses are given to the "process and print" function 81, one license is given to the "conversion into a monochrome color mode and print" function 82, and one license is given to the "conversion into a full color mode and print" function 83.

In the aforementioned system, it is assumed that the terminal device 1 activates the software 78 in the server 3. In this case, the CPU 31 of the server 3 determines whether the number of licenses currently permitted for the use of the basic function 79 is equal to the number of licenses initially set for the basic function 79. Concretely, it is determined whether the number of licenses currently available in the license management table T2 of the storing portion 35 of the server 3 is "0." In the basic function non-use state, since the number of currently available licenses is "3" as shown in FIG. 11, the CPU 31 determines to permit the use of the basic function 79. Then, the CPU 31 subtracts "1" from the number of licenses in the license management table T2 and updates the number of currently available licenses to "2" as shown in FIG. 12. In this way, the software 78 is activated through the terminal device 1.

Subsequently, it is assumed that the terminal device 1 activates the application function, e.g., "edit and print" function 80. The CPU 31 discriminates whether the number of licenses currently available for the use of the application function, "edit and print" function 80 in the license management table T2 is "0." Since the number of licenses set initially is "1" as shown in FIG. 12, the CPU 31 determines to permit the use of the application function, "edit and print" function 80, and subtracts "1" from the number of licenses for the use of the application function, "edit and print" function 80, shown in the license management table T2 to update the number of currently available licenses to "0" as shown in FIG. 13. In this state, the terminal device 1 can use the application function, "edit and print" function 80, and this function can be executed by using any one of the printing apparatuses 4-6.

It is assumed that the terminal device 2 activates the basic function 79 of the server 3 when the application function of the software 78, "edit and print" function 80, is being used. At this time, the number of licenses for the use of the basic function 79 in the license management table T2 stored in the storing portion 38 of the server 3 is "2" as shown in FIG. 13, and the number of licenses currently permitted for the use of the basic function 79 has not yet reached the number of licenses initially set. Therefore, the CPU 31 of the server 3 determines to permit the use of the basic function 79, and then decreases "1" from the number of licenses for the use of the basic function 79 in the license management table T2 to update the number of licenses currently available to "1" as shown in FIG. 14. Thus, the software 78 will be activated by the terminal unit 2.

Subsequently, it is assumed that the terminal device 2 activates the application function, e.g., "edit and print" function 80. At this time, the number of licenses currently available for the use of the application function, "edit and print" function 80 in the license management table T2 is "0" as shown in FIG. 14, and the number of licenses permitted for the use of the application function has already reached the number of licenses initially set. Accordingly, the CPU 31 determines to refuse the newly requested use of the application function, "edit and print" function 80, and then notifies the terminal device 2 that the application function, "edit and print" function 80, is not permitted.

In this state, it is assumed that the use of the application function, "edit and print" function 80, by the terminal device 1 is terminated. At this time, the number of the licenses currently available for the use of the application function, "edit and print" function 80 in the license management table T2 is "0" as shown in FIG. 14. Accordingly, upon the termination of the use of the application function, the CPU 31 adds "1" to the number of licenses for the application function, "edit and print" function 80, and updates the number of currently available licenses for the use of the application license, "edit and print" function 80 in the license management table T2 to "1."

Furthermore, it is assumed that the use of software 78 by the terminal device 1 is terminated in this state. At this time, as shown in FIG. 15, since the number of licenses for the use of the basic function 79 in the license management table T2 is "1," the CPU 31 of the server apparatus 3 adds "1" to the number of licenses for the basic function 79 and updates the number of licenses for the basic function 79 to "2" as shown in FIG. 12.

The license management of another application functions 81-83 may also performed by the same procedure as mentioned above.

As will be apparent from the above, since the license agreement can be made for each application function 80-83 in the software 78 other than the basic function 79, the number of licenses for some application software requiring a relatively long processing time can be limited. Accordingly, smooth license operation of the software 78 can be attained.

Figure 16:
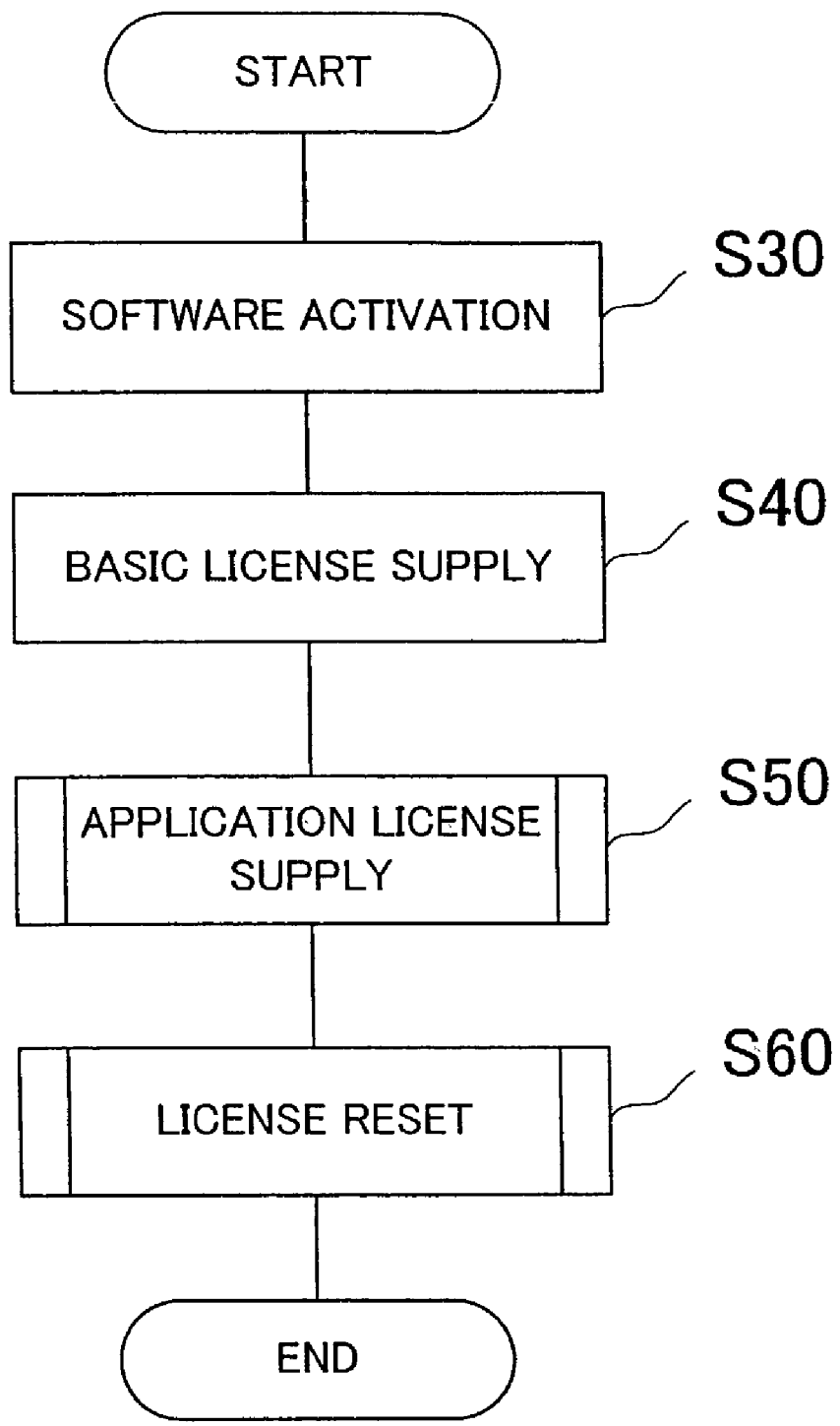
FIG. 16 is a flowchart showing the basic operation of the server in a system according to an embodiment of the invention.

Next, the control by the server 3 according to an embodiment of the invention will be explained with reference to the flowchart shown in FIG. 16.

When the server receives a request for activating the software from the user's terminal devices 1 or 2, the software is activated in S30, and the basic license supply processing is performed in S40. Subsequently, the application license supply processing is performed in S50, and then the license reset is performed in S60.

Figure 17:
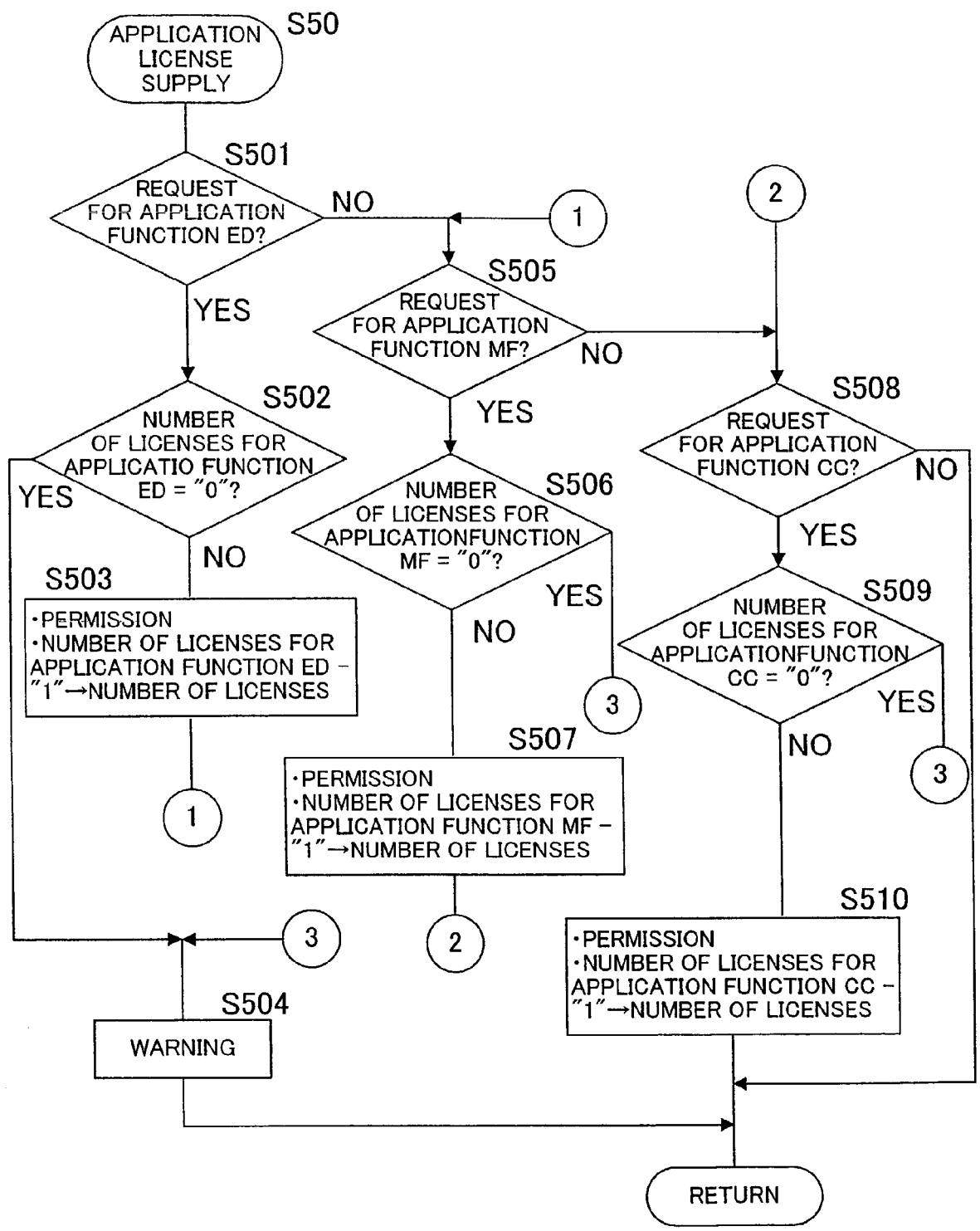
FIG. 17 is a flowchart showing the subroutine of the application function license supply processing (S50)

Next, the subroutine of the application license supply processing S50 will be explained with reference to FIG. 17. In this explanation, it is assumed that the operation functions for executing the printing apparatuses 4-6 include three functions, i.e., "edit and print" function, "process and print" function and "conversion into a full color mode and print" function. The operation functions of "edit and print," "process and print" and "conversion into a full color mode and print" will be referred to as "application function ED", "application function MF" and "application function CC," respectively.

In S501, it is determined whether the request is directed to the use of the application function ED. If it is directed to the use of the application function ED (YES in S501), the routine proceeds to S502. To the contrary, if the request is not directed to the use of the application function ED (NO in S501), the routine proceeds to S505.

In S502, it is determined whether the number of licenses currently available for the use of the application function ED stored by the storing portion 35 is "0." If it is not "0" (NO in S502), the use of the application function ED is permitted in S503, and "1" is subtracted from the number of licenses currently available. Then, the routine proceeds to S505. If the number of licenses is "0" in S502, i.e., the number of licenses currently permitted for the use of the application function ED has reached the number of licenses initially set (YES in S502), since the number of licenses is insufficient and the application function cannot be used. Therefore, the warning processing is performed in S504, and the routine returns. This warning processing notifies the user's terminal device that the operation function cannot be used.

In S505, it is determined whether the request is directed to the use of the application function MF. If it is directed to the use of the application function MF (YES in S505), the routine proceeds to S506. To the contrary, if it is not directed to the use of the application function MF (NO in S505), the routine proceeds to S508.

In S506, it is determined whether the number of licenses currently available is "0". If the number of licenses is not "0"(NO in S506), the use of the application function MF is permitted in S507, and "1" is subtracted from the number of licenses currently available. Then, the routine proceeds to S508. In S506, if the number of licenses is "0", i.e., the number of licenses currently permitted for the application function MF has reached the number of licenses initially set (YES in S506), the warning processing is executed in S504. Then, the routine returns as it is.

In S508, it is determined whether the request is directed to the use of the application function CC. If it is directed to the use of the application function CC (YES in S508), the routine proceeds to S509. To the contrary, if it is not directed to the use of the application function CC (NO in S508), the routine returns as it is.

In S509, it is determined whether the number of licenses currently available for the use of the application function CC stored in the storing portion 35 is "0." If it is not "0" (NO in S509), the use of the application function CC is permitted and "1" is subtracted from the number of licenses in S510. In S509, if the number of licenses currently available is "0," i.e., the number of licenses currently permitted for the application function CC has reached the number of license initially set (YES in S509), the warning processing is performed in S504. Then, the routine returns.

Figure 18:
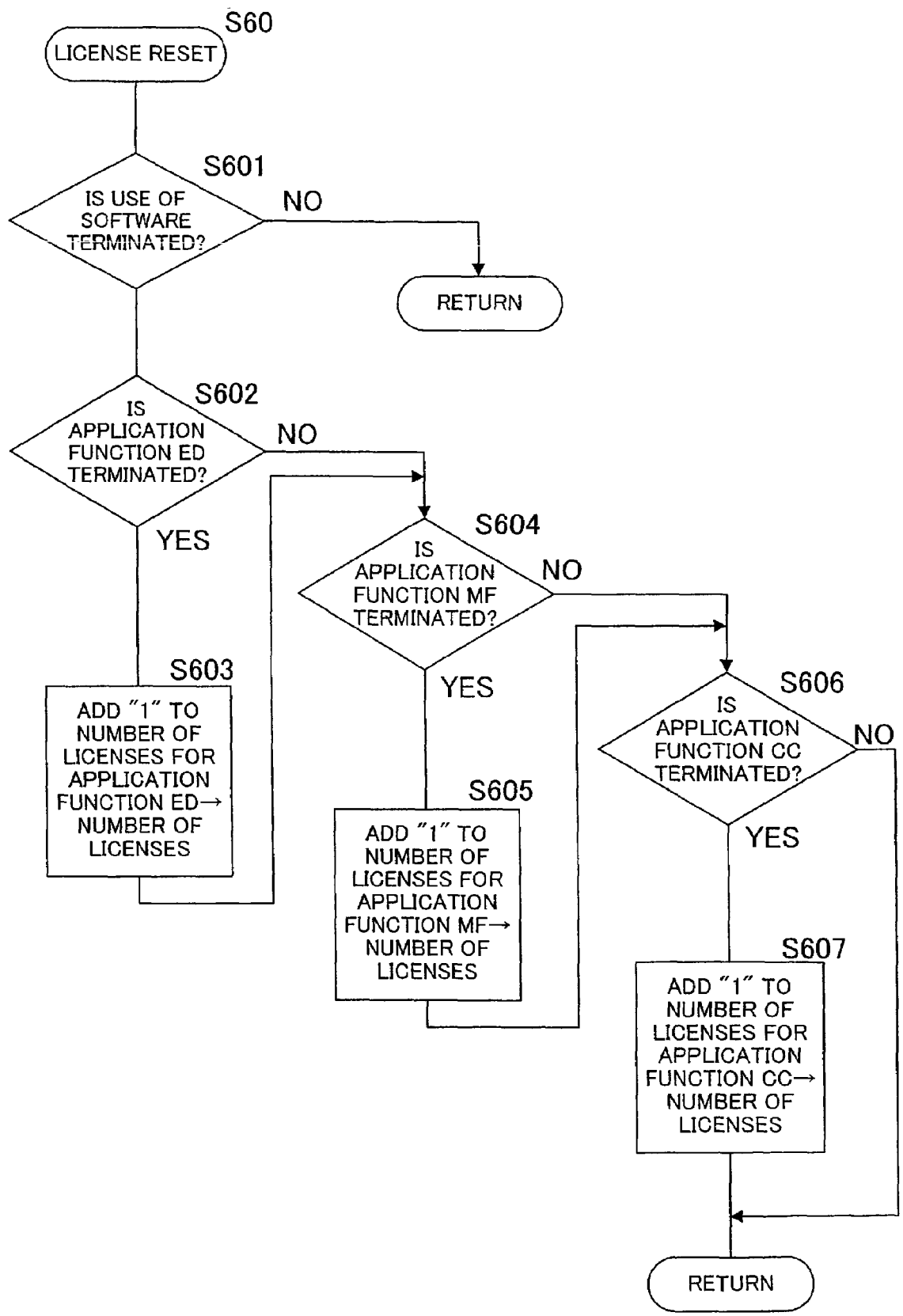
FIG. 18 is a flowchart showing a subroutine of a license reset processing according to an embodiment of the invention.

Next, the subroutine of the license reset processing shown in FIG. 16 will be explained with reference to the flowchart shown in FIG. 18.

In S601, it is determined whether the use of the software is terminated. If the use of the software is terminated (YES in S601), the routine proceeds to S602. To the contrary, if the use of the software is not terminated (NO in S601), the routine returns as it is.

In S602, it is determined whether the use of the application function ED is terminated. If the use of the application function ED is terminated (YES in S602), "1" is added to the number of licenses for the use of the application function ED in S603, and the routine proceeds to S604. If the use of the application function ED is not terminated (NO in S602), the routine proceeds to S604 as it is.

In S604, it is determined whether the use of the application function MF is terminated. If the use of the application function MF is terminated (YES in S604), "1" is added to the number of licenses for the use of the application function MF, and the routine proceeds to S606. To the contrary, if the use of the application function MF is not terminated (NO in S604), the routine proceeds to S606 as it is.

In S606, it is determined whether the use of the application function CC is terminated. If the use of the application function CC is terminated (YES in S606), "1" is added to the number of licenses currently available for the application function CC in S607. Then, the routine returns. To the contrary, if the use of the application function CC is not completed (NO in S606), the routine returns as it is.

According to the aforementioned embodiment, as the operation function for executing the printing apparatuses 4-6, besides the basic function, the image processing functions of "edit and print," "process and print," "conversion into a monochrome color mode and print" and "conversion into a full color mode and print" in the print control software are exemplified. The operation functions are, however, not restricted to the above. For example, the operation functions may include functions for copy control software, for example, "double-sided copy" function, "2 in 1" function in which two sheets (pages) are copied onto one sheet (page), "4 in 1" function in which four sheets (pages) are copied onto one sheet(page), "weekly magazine binding" function and "finisher finishing" function.

Although preferred embodiments according to the present invention are explained above, it should be noted that the present invention is not limited to these embodiments. For example, in the system of each of the aforementioned embodiments, it is explained that the CPU 31 of the server 3 constitutes the discriminating means for discriminating whether the number of licenses currently permitted for the corresponding operation function has reached the number of licenses initially set upon request for the use of the operation function and the determinator to determine whether the use of the requested operation function is to be permitted based on the discrimination result, and that the server 3 is equipped with the storing portion 35 for storing the number of licenses. However, any one of the printing apparatuses 4-6 may be equipped with a function as the server 3, and the printing apparatus may be equipped with a discriminator, a determinator and the storing portion 35.

Furthermore, the discriminator, the determinator and the storing portion 35 may be provided to the printing apparatuses 4, 5 and 6, respectively. In other words, for example, the discriminator may be provided in the printing apparatus 4, the determinator may be provided in the printing apparatus 5, and the storing portion 35 may be provided in the printing apparatus 6.

Furthermore, all of the printing apparatuses 4-6 may be equipped with a discriminator, a determination and a storing portion, and the subtraction/addition of the number of licenses may be performed by communication operation among the printing apparatus 4.

The terms and descriptions in this specification are used only for explanatory purposes and the present invention is not limited to these terms and descriptions. It should be appreciated that there are many modifications and substitutions without departing from the spirit and the scope of the present invention which is defined by the appended claims. A present invention permits any design-change, unless it deviates from the soul, if it is within the limits by which the claim was performed.

What is claimed is:

1. A license management apparatus, comprising:
a storing portion to store a number of currently available licenses corresponding to each of a plurality of operation functions which may be performed on a plurality of operating function executing units, wherein
the plurality of operation functions comprise a first operation function and a second operation function which are different individually licensed hardware functions to be performed on the same operating function executing unit,
the number of currently available licenses comprises a plurality of currently available licenses corresponding to the first operation function and a plurality of currently available licenses corresponding to the second operation function, and
the number of currently available licenses corresponding to the first operation function is not equal to the number of currently available licenses corresponding to the second operation function;
a discriminator to determine, upon a request to use one of the operation functions, whether the number of licenses currently permitted for the use of the requested operation function has reached a predetermined number based on contents of said storing portion, wherein when the requested operation function is an application function, the discriminator determines whether use of a corresponding operation function is permitted, wherein the corresponding operation function is a basic function, and only upon determining that the use of the basic function is permitted, the discriminator determines whether use of the application function is permitted; and a permission determination unit to determine whether the request for the use of the operation function is to be permitted based on a result of said discriminator.

2. The license management apparatus as recited in claim 1, further comprising a subtracter to subtract a "1" from the number of licenses currently available and stored in said storing portion when said permission determination unit determines that the request for the use of the operation function is permitted, wherein said discriminator determines whether the number of licenses currently permitted has reached a predetermined number based on the number of licenses currently available after the subtraction.

3. The license management apparatus as recited in claim 1, further comprising an adder to add a "1" to the number of licenses currently available and stored in said storing portion when the use of the operation function is terminated, wherein said discriminator determines whether the number of licenses currently permitted has reached a predetermined number based on the number of licenses currently available after the addition.

4. The license management apparatus as recited in claim 1, wherein the operation functions include a facsimile function, a copy function and a printer function.

5. The license management apparatus as recited in claim 1, wherein one of the operation functions is an image processing function.

6. The license management apparatus as recited in claim 1, further comprising a receiver to receive the request for the use of the operation function from a terminal device.

7. The license management apparatus as recited in claim 6, further comprising a notifier to notify said terminal device that the request for the use of the operation function is refused upon a refusal determination by said permission determination unit.

8. A license management system to manage a plurality of licenses of at least one of a plurality of operation function executing units connected to a network, said license management system comprising:

a storing portion to store a number of currently available licenses to use each of a plurality of operation functions of the operating function executing units, wherein the plurality of operation functions comprise a first operation function and a second operation function which are different individually licensed hardware functions to be performed on the same operating function executing unit, the number of currently available licenses comprises a plurality of currently available licenses corresponding to the first operation function and a plurality of currently available licenses corresponding to the second operation function, and the number of currently available licenses corresponding to the first operation function is not equal to the number of currently available licenses corresponding to the second operation function;

a discriminator to determine, upon a request to use one of the operation functions, whether the number of licenses currently permitted for the use of the requested operation function has reached a predetermined number based on contents of said storing portion, wherein when the requested operation function is an application function, the discriminator determines whether use of a corresponding operation function is permitted, wherein the corresponding operation function is a basic function, and only upon determining that the use of the basic function is permitted, the discriminator determines whether use of the application function is permitted; and a permission determination unit to determine whether the request for the use of the operation function is to be permitted based on a result of said discriminator.

9. A license management method, comprising:

storing a number of licenses for a use of each of a plurality of operation functions of at least one of a plurality of operating function executing units, wherein the plurality of operation functions comprise a first operation function and a second operation function which are different individually licensed hardware functions to be performed on the same operating function executing unit, the number of currently available licenses comprises a plurality of currently available licenses corresponding to the first operation function and a plurality of currently available licenses corresponding to the second operation function, and the number of currently available licenses corresponding to the first operation function is not equal to the number of currently available licenses corresponding to the second operation function;

determining whether the number of licenses currently permitted for the use of one of the operation functions has reached a predetermined number based on contents of said storing portion upon request for the use of one of the operation functions, wherein when the one of the operation wherein when one of the operation functions is an application function, the determining comprises determining whether use of a corresponding operation function is permitted, wherein the corresponding operation function is a basic function, and only upon determining that the use of the basic function is permitted, determining whether use of the application function is permitted based on whether the number of licenses currently permitted has reached the predetermined number.

* * * * *